(12) United States Patent
Zhao et al.

(10) Patent No.: US 9,485,759 B2
(45) Date of Patent: Nov. 1, 2016

(54) MULTIPLE-INPUT MULTIPLE-OUTPUT (MIMO) TRANSMISSION METHOD AND APPARATUS

(71) Applicant: Huawei Technologies Co., Ltd., Shenzhen, Guangdong (CN)

(72) Inventors: Yueying Zhao, Shanghai (CN); Xueli Ma, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 14/526,075

(22) Filed: Oct. 28, 2014

(65) Prior Publication Data
US 2015/0049742 A1    Feb. 19, 2015

Related U.S. Application Data

(63) Continuation of application No. PCT/CN2013/073520, filed on Mar. 30, 2013.

(30) Foreign Application Priority Data

Apr. 28, 2012 (CN) .......................... 2012 1 0132496

(51) Int. Cl.
*H04W 72/04* (2009.01)
*H04L 1/18* (2006.01)
(Continued)

(52) U.S. Cl.
CPC ....... *H04W 72/0413* (2013.01); *H04B 7/0413* (2013.01); *H04L 1/0675* (2013.01); *H04L 1/1812* (2013.01); *H04L 1/1861* (2013.01); *H04L 5/0055* (2013.01); *H04W 72/06* (2013.01)

(58) Field of Classification Search
CPC ............ H04W 72/0413; H04W 72/06; H04L 1/1812; H04L 1/0675; H04L 1/1861; H04L 1/18; H04L 1/1822; H04L 1/1825; H04L 1/1864; H04L 1/1896; H04B 7/024; H04B 7/0452; H04B 7/0413
See application file for complete search history.

(56) References Cited

U.S. PATENT DOCUMENTS

| | | | | |
|---|---|---|---|---|
| 2002/0054578 A1* | 5/2002 | Zhang | ................... | H04L 1/0001 370/328 |
| 2006/0133325 A1* | 6/2006 | Harris | ................... | H04W 72/04 370/336 |

(Continued)

FOREIGN PATENT DOCUMENTS

| | | |
|---|---|---|
| CN | 101031094 A | 9/2007 |
| EP | 2 555 461 A2 | 2/2013 |

(Continued)

OTHER PUBLICATIONS

"HARQ retransmission operation for UL MIMO", Qualcomm Incorporated, 3GPP TSG RAN WG1 Meeting #68bis, Mar. 30, 2012, 3 pages.

(Continued)

*Primary Examiner* — Warner Wong

(57) ABSTRACT

Embodiments of the present invention disclose an uplink MIMO transmission method, including: sending, by a UE, first data to a base station (NodeB) in a first process in an HARQ_RTT, and receiving an acknowledgement character related to the first data and returned by the NodeB; and determining, by the UE according to the acknowledgement character and a rank value to be used for next transmission, data transmission of the first process in a next HARQ_RTT. The present invention further provides a corresponding user equipment and base station. Implementing the method and apparatus provided by the present invention can enable a UE to correctly perform HARQ transmission using MIMO, thereby effectively ensuring performance of MIMO.

14 Claims, 3 Drawing Sheets

(51) Int. Cl.
*H04B 7/04* (2006.01)
*H04L 1/06* (2006.01)
*H04L 5/00* (2006.01)
*H04W 72/06* (2009.01)

(56) References Cited

U.S. PATENT DOCUMENTS

| | | | |
|---|---|---|---|
| 2009/0257408 A1* | 10/2009 | Zhang | H04L 1/1621 370/336 |
| 2009/0282310 A1* | 11/2009 | Seok | H04B 7/0417 714/748 |
| 2010/0034127 A1* | 2/2010 | Iwamura | H04W 52/0225 370/311 |
| 2010/0192035 A1* | 7/2010 | Sagfors | H04L 1/1819 714/748 |
| 2010/0202386 A1* | 8/2010 | Takaoka | H04L 1/0083 370/329 |
| 2011/0038323 A1* | 2/2011 | Liang | H04L 12/5693 370/329 |
| 2011/0128941 A1* | 6/2011 | Ishii | H04L 1/1887 370/336 |
| 2011/0235586 A1 | 9/2011 | Han et al. | |
| 2011/0310830 A1* | 12/2011 | Wu | H04W 72/1289 370/329 |
| 2012/0002616 A1* | 1/2012 | Ishii | H04B 1/713 370/329 |
| 2012/0039200 A1* | 2/2012 | Lee | H04W 52/0216 370/252 |
| 2012/0057451 A1 | 3/2012 | Kim et al. | |
| 2012/0076078 A1 | 3/2012 | Han et al. | |
| 2012/0182958 A1* | 7/2012 | Pelletier | H04L 5/001 370/329 |
| 2012/0213196 A1* | 8/2012 | Chung | H04B 1/713 370/330 |
| 2013/0039208 A1* | 2/2013 | Jonsson | H04L 41/0816 370/252 |
| 2013/0114472 A1* | 5/2013 | Tamaki | H04L 1/1854 370/280 |
| 2014/0071860 A1* | 3/2014 | Susitaival | H04W 52/0216 370/280 |
| 2015/0063250 A1* | 3/2015 | Lahetkangas | H04L 1/1812 370/329 |
| 2015/0110027 A1* | 4/2015 | Lim | H04L 1/1812 370/329 |

FOREIGN PATENT DOCUMENTS

| | | |
|---|---|---|
| EP | 2 587 704 A2 | 5/2013 |
| WO | WO 2011/122832 A2 | 10/2011 |
| WO | WO 2011/162541 A2 | 12/2011 |

OTHER PUBLICATIONS

"HARQ and Retransmission Functionality for Uplink MIMO with 64QAM", Ericsson, 3GPP TSG-RAN WG1 #68bis, Mar. 26-30, 2012, 6 pages.

"UL MIMO H-ARQ Operation", Nokia Siemens Networks, 3GPP TSG RAN WG1 Meeting #68bis, Mar. 26-30, 2012, 7 pages.

"S-E-DPCCH for UL MIMO", Nokia Siemens Networks, 3GPP TSG RAN WG1 Meeting #68bis, May 26-30, 2012, 5 pages.

"Scheduling and Rank Selection for HSUPA MIMO", Nokia Siemens Networks, 3GPP TSG RAN WG1 Meeting #68-bis, Mar. 26-30, 2012, 19 pages.

* cited by examiner

MULTIPLE-INPUT MULTIPLE-OUTPUT (MIMO) TRANSMISSION METHOD AND APPARATUS

CROSS-REFERENCE TO RELATED APPLICATIONS

This application is a continuation of International Application No. PCT/CN2013/073520, filed on Mar. 30, 2013, which claims priority to Chinese Patent Application No. 201210132496.9, filed on Apr. 28, 2012, all of which are hereby incorporated by reference in their entireties.

TECHNICAL FIELD

The present invention relates to the field of communications, and in particular, to a multiple-input multiple-output (MIMO) transmission method and apparatus.

BACKGROUND

A multiple-input multiple-output (Multi-Input Multi-Output, MIMO) technology, as one of important technologies for improving a peak rate of a user, has currently become important performance of many communications systems, for example, an LTE (Long Term Evolution, long term evolution) system, and a UMTS HSDPA (Universal Mobile Telecommunications System High Speed Downlink Packet Access, universal mobile telecommunications system high speed downlink packet access) system, and the like.

In a UMTS uplink communications system, in order to further improve a peak rate of a user, that is, to double the original 11 Mbps (Mbit/s), a MIMO technology becomes an important solution. In a UMTS system, hybrid automatic repeat request (Hybrid Automatic Repeat ReQuest, HARQ), as a channel encoding technology, can effectively guarantee correct data transmission. The number of HARQ processes is equal to an HARQ round trip time (Hybrid Automatic Repeat reQuest Round Trip Time, HARQ_RTT). When a TTI (Transmission Time Interval, transmission time interval) is 2 ms, HARQ_RTT is equal to 8; and when TTI is 10 ms, HARQ_RTT is equal to 4.

In high-speed uplink packet access (High-Speed Uplink Packet Access, HSUPA) communications, when data transmission in a certain process in a current HARQ_RTT is incorrect, a UE (User Equipment, user equipment) may retransmit the data in a same process in a next HARQ_RTT; and after receiving the retransmitted data, a base station (NodeB) can combine it with the data transmitted last time, thereby improving a data transmission correctness rate.

However, after the MIMO technology is introduced into the HSUPA communications, more than one data stream may be sent at a same time, and whether transmission is correct is mutually independent between two data streams; therefore, an existing HARQ mechanism cannot support data transmission using MIMO. In addition, a rank (rank) in MIMO is adaptive, that is, a rank value in each scheduling cycle may change. Therefore, when a rank change is combined with HARQ retransmission, how to perform corresponding HARQ processing is still an issue that cannot be resolved by existing solutions.

SUMMARY

The present invention provides a multiple-input multiple-output (MIMO) transmission method. Under independent indications of a rank value and an acknowledgement character and without changing an existing uplink HARQ mechanism, a user equipment (UE) can correctly perform HARQ transmission using MIMO, thereby effectively ensuring performance of MIMO.

According to a first aspect of the present invention, a multiple-input multiple-output (MIMO) transmission method is provided, including:

sending, by a user equipment (UE), first data to a base station (NodeB) in a first process in a hybrid automatic repeat request round trip time (HARQ_RTT), and receiving an acknowledgement character related to the first data and returned by the NodeB; and determining, by the UE according to the acknowledgement character and a rank value to be used for next transmission, data transmission of the first process in a next HARQ_RTT.

According to a second aspect of the present invention, a user equipment is provided, including:

a processing module, configured to send first data in a first process in a hybrid automatic repeat request round trip time (HARQ_RTT) to a base station (NodeB), and receive an acknowledgement character related to the first data and returned by the NodeB; and a determining module, configured to determine, according to the acknowledgement character and a rank value to be used for next transmission, data transmission of the first process in a next HARQ_RTT.

According to a third aspect of the present invention, a base station is provided, including:

a control module, configured to detect channel code of a first enhanced dedicated channel (E-DCH) dedicated physical control channel and a second enhanced dedicated channel (E-DCH) dedicated physical control channel, so as to determine first stream data and second stream data.

Implementation of the embodiments of the present invention brings the following beneficial effects: In the present invention, data transmission of a same process in a next HARQ_RTT is determined according to an acknowledgement character related to data transmitted in a previous time and a rank value to be used for next transmission, so that a user equipment UE correctly performs HARQ transmission using MIMO without changing an existing uplink HARQ mechanism, thereby effectively ensuring performance of MIMO; and moreover, a base station may be enabled to identify main and sub stream data transmission when a rank value is 1.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
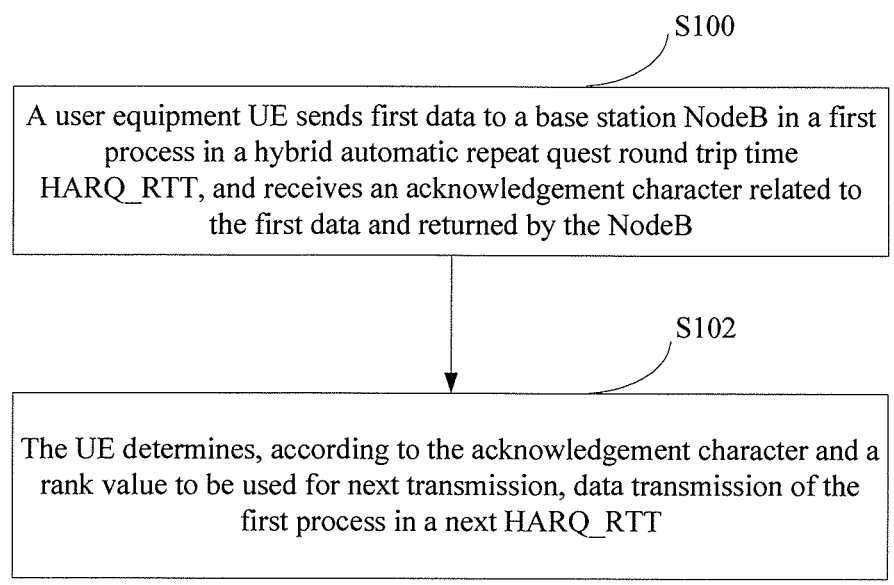
FIG. 1 shows a schematic diagram of a multiple-input multiple-output (MIMO) transmission method according to an embodiment of the present invention.

Referring to FIG. 1, FIG. 1 shows a schematic diagram of a multiple-input multiple-output (MIMO) transmission method according to an embodiment of the present invention, where the method may specifically include:

S100: A user equipment UE sends first data to a base station (NodeB) in a first process in a hybrid automatic repeat request round trip time (HARQ_RTT), and receives an acknowledgement character related to the first data and returned by the NodeB.

S102: The UE determines, according to the acknowledgement character and a rank value to be used for next transmission, data transmission of the first process in a next HARQ_RTT.

In the embodiment of the present invention, in step S100, the UE sends the first data to the base station (NodeB) in the first process in the HARQ_RTT, and it should be noted that the first process in the embodiment of the present invention may be any process in the HARQ_RTT. The first process in the HARQ_RTT in the embodiment of the present invention may belong to a procedure of initial data transmission or data retransmission; then, the first process in the next HARQ_RTT may correspond to the first retransmission or next retransmission. A rank value (rank) of a user equipment (UE) in MIMO communications may be adaptive. In other words, a rank value in each scheduling cycle may change, and the first data may include different data streams according to different rank values. When a rank value is 1, which corresponds to single-stream data transmission, first data may include single-stream data formed by one data block (block); when a rank value is 2, which corresponds to double-stream data transmission, first data may include double-stream data formed by two data blocks; and according to different rank values, data of more streams may be included. In the following, the single-stream data is referred to as main stream data; the double-stream data is referred to as main stream data and sub stream data, or main and sub stream data.

After a user equipment (UE) sends first data to a base station (NodeB) in a first process (for ease of description in the following, the first process is referred to as process D1, where process D1 may be any process in an HARQ_RTT) in an HARQ_RTT, the base station (NodeB) performs corresponding data processing, and then feeds back an acknowledgement character (ACK/NACK) related to the first data to the UE, where the acknowledgement character is used to indicate information about whether transmission of the first data is correct. For example, when the first data is main stream data, the acknowledgement character may include two cases: the main stream data is correct, and the main stream data is wrong. For another example, when the first data is main and sub stream data, the acknowledgement character may include four cases: both the main and sub stream data are correct; the main stream data is correct but the sub stream data is wrong; the main stream data is wrong but the sub stream data is correct; and both the main and sub stream data are wrong.

After receiving an acknowledgement character sent by a NodeB, a user equipment (UE) determines, according to the received acknowledgement character and a rank value to be used for next transmission, data transmission of a same process D1 (that is, the first process) in a next HARQ_RTT. The rank value to be used for the next transmission (that is, transmission of process D1 in the next HARQ_RTT) may be 1 (the rank value 1 corresponds to a single-stream transmission form) or 2 (the rank value 2 corresponds to a double-stream transmission form), or another value, which is adaptively determined in MIMO transmissions. In the embodiment of the present invention, a situation in which the UE determines, according to a rank value and an acknowledgement character, data transmission of a same process in a next HARQ_RTT is described only by using examples that rank values are 1 or 2. A person skilled in the art may determine data transmission when the rank value is another value according to the method disclosed by the embodiment of the present invention.

When a user equipment UE sends main stream data to a NodeB in process D1 in an HARQ_RTT according to a single-stream transmission form corresponding to a rank value 1, an acknowledgement character related to the main stream data and received from the NodeB by the UE indicates that the main stream data is correct, and a rank value to be used for next transmission is 1 (which corresponds to single-stream data transmission), the UE sends new main stream data in process D1 in a next HARQ_RTT according to a single-stream transmission form corresponding to the rank value 1, and adopts a power offset newly scheduled in process D1 in the next HARQ_RTT. The newly scheduled power offset is determined by the base station according to a scheduling algorithm and is notified to the UE in a form of the power offset. Specifically, the base station determines, according to such factors as a priority of the UE and the network load currently, a schedule grant that the UE can obtain, where the schedule grant is equivalent to a power which the UE can obtain when performing sending. The UE performs sending according to the scheduled power, which can guarantee that the base station is not overloaded, thereby ensuring network transmission performance. When an acknowledgement character received by the UE indicates that the main stream data is correct, and a rank value to be used for next transmission is 2 (which corresponds to double-stream data transmission), the UE sends new main stream data and new sub stream data in process D1 in a next HARQ_RTT according to a double-stream transmission form corresponding to the rank value 2 used in the current transmission, and adopts a power offset newly scheduled in process D1 in the next HARQ_RTT.

When a UE sends main stream data to a NodeB in process D1 in an HARQ_RTT according to a single-stream transmission form corresponding to a rank value 1, a received acknowledgement character indicates that the main stream data is wrong, and a rank value for next transmission is 1, the UE can retransmit the main stream data in process D1 in a next HARQ_RTT according to a single-stream transmission form corresponding to the rank value 1, and adopt a historical power offset (for ease of description, here and in the following, the historical power offset refers to a power offset scheduled in process D1 in a previous HARQ_RTT). When a UE sends main stream data to a NodeB according to a single-stream transmission form corresponding to a rank value 1, a received acknowledgement character indicates that the main stream data is wrong, and a rank value for next transmission is 2, according to a double-stream transmission form corresponding to the rank value 2, the UE retransmits the main stream data and sends new sub stream data at a same time in the next transmission, and adopts a new power offset, which is corresponding to the main stream data according to the rank value 2. In the embodiment, in a situation in which a rank value changes from 1 to 2, a new power offset adopted for data of a same block length can effectively suppress inter-stream interference, and ensure data transmission performance. In some other embodiments of the present invention, when a UE sends main stream data to a NodeB according to a rank value 1, a received acknowledgement character indicates that the main stream data is wrong, and a rank value for next transmission is 2, even though the rank value is 2, the UE may retransmit the main stream data still according to a single-stream transmission form corresponding to the rank value 1, and adopt a historical power offset. In some application scenarios of the present invention, in a situation in which there is no new main stream data or sub stream data to be transmitted on a UE side, a UE may retransmit only main stream data or sub stream data according to a single-stream transmission form and in process D1 in a next HARQ_RTT, where the main stream data or the sub stream data is incorrectly transmitted in process D1 in a previous HARQ_RTT.

When a user equipment (UE) sends main and sub stream data to a NodeB in process D1 in an HARQ_RTT according to a double-stream transmission form corresponding to a rank value 2, a received acknowledgement character indicates that the main and sub stream data are both correct, and a rank value for next transmission is 1, the UE may send new main stream data in process D1 in a next HARQ_RTT according to a single-stream transmission form corresponding to the rank value 1, and adopt a power offset newly scheduled in process D1 in the next HARQ_RTT. When a UE sends main and sub stream data to a NodeB in process D1 in an HARQ_RTT according to a rank value 2, a received acknowledgement character indicates that the main and sub stream data are both correct, and a rank value for next transmission is 2, the UE may send new main stream data and new sub stream data in process D1 in a next HARQ_RTT according to a double-stream transmission form corresponding to the rank value 2, and adopt a power offset newly scheduled in process D1 in the next HARQ_RTT.

When a UE sends main and sub stream data to a NodeB in process D1 in an HARQ_RTT according to a double-stream transmission form corresponding to a rank value 2, a received acknowledgement character indicates that the main stream data is correct but the sub stream data is wrong, and a rank value for next transmission is 1, the UE may retransmit the sub stream data in process D1 in a next HARQ_RTT according to a single-stream transmission form corresponding to the rank value 1, where the retransmission of the sub stream data may adopt a new power offset, which is corresponding to the sub stream data according to the rank value 1, may adopt a power offset newly scheduled in process D1 in the next HARQ_RTT, or the larger value of the two, that is Max {a new power offset corresponding to the sub stream data according to the rank value 1, a power offset newly scheduled in process D1 in the next HARQ_RTT}. In other words, when the main stream data is correct but the sub stream data is wrong in the previous transmission, and the rank value to be used for the next transmission is 1, a power offset that the UE may adopt to retransmit the sub stream data has any one of the foregoing three forms. In different application scenarios, different power offsets may be adopted. For example, in a situation in which channel quality changes little between two times of transmission, adopting a historical power offset can obtain a relatively good combined gain. However, in such a situation, it is possible that main stream data cannot be scheduled, that is, the base station may schedule a new power for the main stream data, but the historical power is adopted for the main stream data for retransmission of the sub stream data. Adopting a newly scheduled power offset can overcome the problem and can implement real-time scheduling; however, if the newly scheduled power offset is less than the historical power offset, a combined gain of the sub stream data may be affected. Adopting the larger value of the two can achieve a compromise between the two manners. In the embodiment, a UE may use a primary enhanced dedicated channel (E-DCH) dedicated physical data channel E-DPDCH and a secondary enhanced dedicated channel (E-DCH) dedicated physical control channel S-E-DPCCH to carry the sub stream data and control information, and a base station (NodeB) side can determine, according to channel code detection, that a data stream in the current transmission is sub stream data. In addition, when performing data transmission in a single-stream transmission form, a UE may further indicate main stream data and sub stream data by using bit information in a non-pilot bit of the S-DPCCH, for example, perform indication by using a form shown in the following Table 1 or Table 2.

TABLE 1

| | Information bit | |
|---|---|---|
| | 1 | 0 |
| Main/Sub stream | Main stream | Sub stream |

TABLE 2

| | Information bit | |
|---|---|---|
| | 11 | 00 |
| Main/Sub stream | Main stream | Sub stream |

Figure 2:
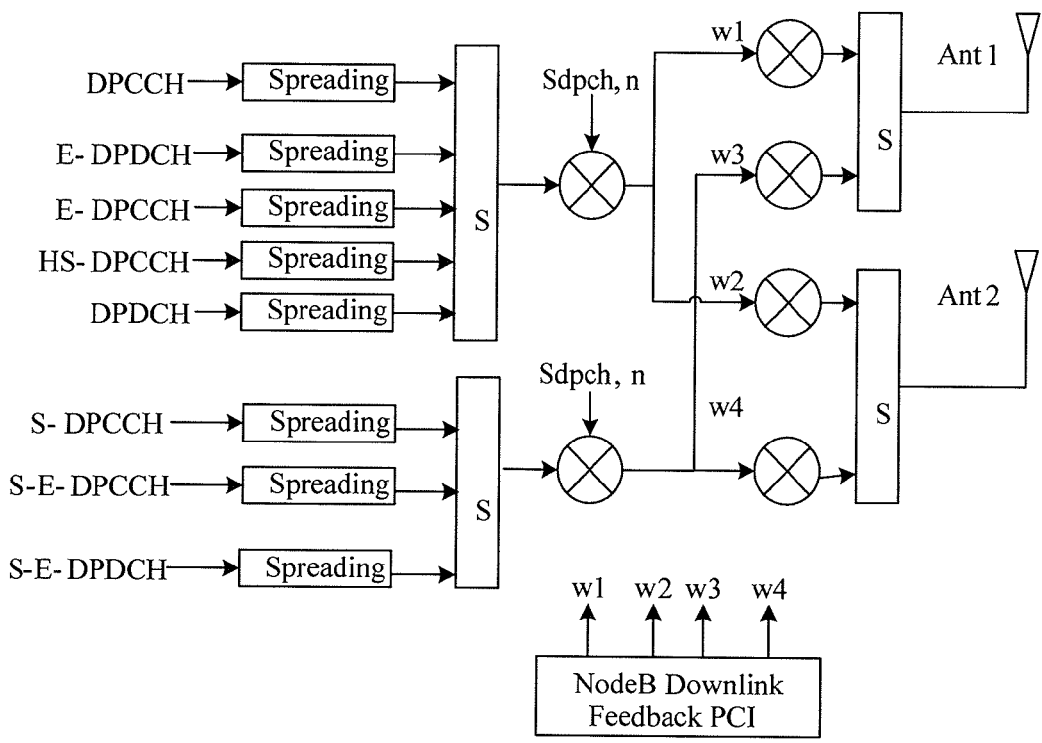
FIG. 2 shows a schematic diagram of a transmitting structure for multiple-input multiple-output MIMO according to an embodiment of the present invention.

In should be noted that, in the retransmission of the sub stream data, the sub stream data is carried on an E-DPDCH data channel, and weighting is performed by using a weighting coefficient of primary precoding weighting. As shown in FIG. 2, generally, in double-stream MIMO, main stream data is weighted by using W1 and W2, and sub stream data is weighted by using W3 and W4. In an embodiment of the sub stream data retransmission of the present invention, an E-DPDCH is adopted to carry to-be-retransmitted sub stream data, and the weights W1 and W2 that are generally used to perform weighting on main stream data are adopted to perform weighting on the to-be-retransmitted sub stream data.

When a UE sends main and sub stream data to a NodeB in process D1 in an HARQ_RTT according to a double-stream transmission form corresponding to a rank value 2, a received acknowledgement character indicates that the main stream data is correct but the sub stream data is wrong, and a rank value for next transmission is 2, the UE may send, according to a double-stream transmission form corresponding to the rank value 2, new main stream data and retransmit the sub stream data at a same time in process D1 in a next HARQ_RTT; and may adopt a historical power configuration, a power offset newly scheduled in process D1 in the next HARQ_RTT, or the larger value of the historical power offset and the power offset newly scheduled in process D1, that is, Max {a historical power offset, a power offset newly scheduled in process D1 in the next HARQ_RTT}. In other words, when sending the new main stream data and retransmitting the sub stream data in the double-stream transmission form, the UE may adopt a power offset of any one of the foregoing three forms. A person skilled in the art may perform a selection according to different application scenarios, for example, in a situation in which channel quality changes little between two times of transmission, adopting a historical power offset can obtain a relatively good combined gain. In some other embodiments of the present invention, when a UE sends main and sub stream data to a NodeB in process D1 in an HARQ_RTT according to a double-stream transmission form corresponding to a rank value 2, a received acknowledgement character indicates that the main stream data is correct but the sub stream data is wrong, and a rank value for next transmission is 2, the UE may retransmit the sub stream data in process D1 in a next HARQ_RTT according to the double-stream transmission form corresponding to the rank value 2, that is, retransmit the sub stream data on both channels on which two data streams, the main stream and the sub stream, should be transmitted originally, and adopt a historical power offset. In some application scenarios of the present invention, in a situation in which there is no new data to be transmitted in process D1 in a next HARQ_RTT, a UE may retransmit only sub stream data according to a single-stream transmission form.

When a UE sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 1, the UE may retransmit the main stream data in process D1 in a next HARQ_RTT according to a single-stream transmission form corresponding to the rank value 1, and adopt a new power offset, which is corresponding to the main stream data according to the rank value 1. For data of a certain block length, in a situation in which rank values used for transmission in a process in a previous HARQ_RTT and in a same process in a next HARQ_RTT are different, adopting a new power offset corresponding to the new rank value can ensure data transmission performance.

When a UE sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 2, the UE may retransmit, according to a double-stream transmission form corresponding to the rank value 2, the main stream data and send new sub stream data at a same time in process D1 in a next HARQ_RTT, and adopt a historical power offset. In some other embodiments of the present invention, when a UE sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 2, the UE may retransmit the main stream data in process D1 in a next HARQ_RTT according to a double-stream transmission form corresponding to the rank value 2, that is, retransmit the main stream data on both channels on which the main and sub stream data should originally be transmitted, and adopt a historical power configuration. In some application scenarios of the present invention, in a situation in which there is no new data to be transmitted on a UE side, a UE may retransmit only main stream data according to a single-stream transmission form.

When a UE sends main and sub stream data to a NodeB in process D1 in an HARQ_RTT according to a rank value 2, a received acknowledgement character indicates that the main and sub stream data are both wrong, and a rank value for next transmission is 1, the UE may, in process D1 in a next HARQ_RTT according to a single-stream transmission form corresponding to the rank value 1, retransmit the main stream data, discard the sub stream data, and adopt a new power offset, which is corresponding to the main stream data according to the rank value 1.

When a UE sends main and sub stream data to a NodeB in process D1 in an HARQ_RTT according to a double-stream transmission form corresponding to a rank value 2, a received acknowledgement character indicates that the main and sub stream data are both wrong, and a rank value for next transmission is 2, the UE may retransmit the main and sub stream data in process D1 in the next HARQ_RTT according to a double-stream transmission form corresponding to the rank value 2, and adopt a historical power offset.

Figure 3:
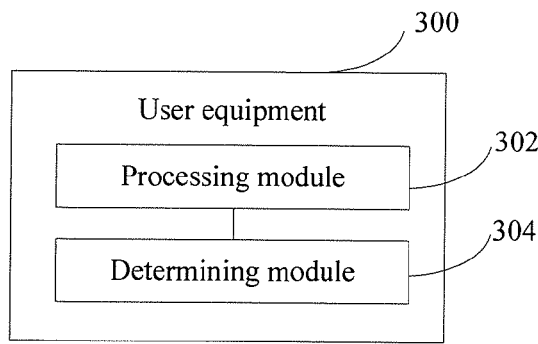
FIG. 3 shows a schematic structural diagram of a user equipment according to an embodiment of the present invention.

Referring to FIG. 3, FIG. 3 shows a schematic structural diagram of a user equipment according to an embodiment of the present invention, where a user equipment 300 may specifically include:

a processing module 302, configured to send first data to a base station (NodeB) in a first process in hybrid automatic repeat request round trip time HARQ_RTT, and receive an acknowledgement character related to the first data and returned by the NodeB; and a determining module 304, configured to determine, according to the acknowledgement character and a rank value to be used for next transmission, data transmission of the first process in a next HARQ_RTT.

In the embodiment of the present invention, a processing module sends first data to a NodeB in a first process (referred to as process D1 in the following for ease of description) in an HARQ_RTT according to a rank value, where the first data includes main stream data (which corresponds to a single-stream transmission form with a rank value 1), or main and sub stream data (which corresponds to a double-stream transmission form with a rank value 2). The first process in the HARQ_RTT in the embodiment of the present invention may belong to a procedure of initial data transmission or data retransmission; then, a first process in a next HARQ_RTT may correspond to first retransmission or a next retransmission. An acknowledgement character received by the processing module is used to indicate information about whether transmission of the first data is correct. For example, when the first data is main stream data, the acknowledgement character may include two cases: the main stream data is correct; and the main stream data is wrong. For another example, when the first data is main and sub stream data, the acknowledgement character may include four cases: both the main and sub stream data are correct; the main stream data is correct but the sub stream data is wrong; the main stream data is wrong but the sub stream data is correct; and both the main and sub stream data are wrong.

When a processing module sends main stream data to a NodeB in process D1 in an HARQ_RTT according to a single-stream transmission form corresponding to a rank value 1, an acknowledgement character related to the main stream data and received from the NodeB indicates that the main stream data is correct, and a rank value for next transmission is 1, a determining module determines sending new main stream data in process D1 in a next HARQ_RTT according to a single-stream transmission form corresponding to the rank value 1, and adopting a power offset newly scheduled in process D1 in the next HARQ_RTT. The newly scheduled power offset is determined by the base station according to a scheduling algorithm and is notified to the UE in a form of the power offset. Specifically, the base station determines, according to such factors as a priority of the UE and the network load currently, a schedule grant that the UE can obtain, where the schedule grant is equivalent to a power which the UE can obtain when performing sending. The UE performs sending according to the scheduled power, which can guarantee that the base station is not overloaded, thereby ensuring network transmission performance. When an acknowledgement character received by the processing module indicates that the main stream data is correct, and a rank value to be used for next transmission is 2, the determining module sends new main stream data and new sub stream data in process D1 in a next HARQ_RTT according to a double-stream transmission form corresponding to the rank value 2 used in the current transmission, and adopts a power offset newly scheduled in process D1 in the next HARQ_RTT.

When a processing module sends main stream data to a NodeB in process D1 in an HARQ_RTT according to a single-stream transmission form corresponding to a rank value 1, a received acknowledgement character indicates that the main stream data is wrong, and a rank value for next transmission is 1, a determining module may retransmit the main stream data in process D1 in a next HARQ_RTT according to a single-stream transmission form corresponding to the rank value 1, and adopt a historical power offset. When a rank value for next transmission is 2, the determining module performs, according to a double-stream transmission form corresponding to the rank value 2, retransmission of the main stream data and sending of new sub stream data at a same time in the next transmission, and adopts a new power offset, which is corresponding to the main stream data according to the rank value 2. In the embodiment, in a situation in which the rank value changes from 1 to 2, a new power offset adopted for data of a same block length can effectively suppress inter-stream interference, and ensure data transmission performance. In some other embodiments of the present invention, when a processing module sends main stream data to a NodeB in process D1 in an HARQ_RTT according to a rank value 1, a received acknowledgement character indicates that the main stream data is wrong, and a rank value for next transmission is 2, even though the rank value is 2, a determining module may retransmit the main stream data still according to a single-stream transmission form corresponding to the rank value 1, and adopt a historical power offset. In some application scenarios of the present invention, in a situation in which there is no new main stream data or sub stream data to be transmitted on a UE side, a determining module may retransmit only main stream data or sub stream data according to a single-stream transmission form and in process D1 in a next HARQ_RTT, where the main stream data or the sub stream data is incorrectly transmitted in process D1 in a previous HARQ_RTT.

When a processing module sends main and sub stream data to a NodeB in process D1 in an HARQ_RTT according to a double-stream transmission form corresponding to a rank value 2, a received acknowledgement character indicates that the main and sub stream data are both correct, and a rank value for next transmission is 1, a determining module may send new main stream data in process D1 in a next HARQ_RTT according to a single-stream transmission form corresponding to the rank value 1, and adopt a power offset newly scheduled in process D1 in the next HARQ_RTT. When a rank value for next transmission is 2, the determining module may send new main stream data and new sub stream data in process D1 in a next HARQ_RTT according to a double-stream transmission form corresponding to the rank value 2, and adopt a power offset newly scheduled in process D1 in the next HARQ_RTT.

When a processing module sends main and sub stream data to a NodeB in process D1 in an HARQ_RTT according to a double-stream transmission form corresponding to a rank value 2, a received acknowledgement character indicates that the main stream data is correct but the sub stream data is wrong, and a rank value for next transmission is 1, a determining module may retransmit the sub stream data in process D1 in a next HARQ_RTT according to a single-stream transmission form corresponding to the rank value 1, where the retransmission of the sub stream data may adopt a new power offset, which is corresponding to the sub stream data according to the rank value 1, or may adopt a power offset newly scheduled in process D1 in the next HARQ_RTT, or the larger value of the two, that is, Max {a new power offset corresponding to the sub stream data according to the rank value 1, a power offset newly scheduled in process D1 in the next HARQ_RTT}. In other words, when the main stream data is correct but the sub stream data is wrong in the previous transmission, and the rank value to be used for the next transmission is 1, a power offset that the UE may adopt to retransmit the sub stream data has the foregoing three forms. In different application scenarios, different power offsets may be adopted. For example, in a situation in which channel quality changes little between two times of transmission, adopting a historical power offset can obtain a relatively good combined gain. However, in such a situation, it is possible that main stream data cannot be scheduled, that is, the base station may schedule a new power for the main stream data, but the historical power is adopted for the main stream data for retransmission of the sub stream data. Adopting a newly scheduled power offset can overcome the problem and can implement real-time scheduling; however, if the newly scheduled power offset is less than the historical power offset, a combined gain of the sub stream data may be affected. Adopting the larger value of the two can achieve a compromise between the two manners. In the embodiment, the determining module may use a primary enhanced dedicated channel E-DCH dedicated physical data channel (E-DCH Dedicated Physical Control Channel, E-DPDCH) and a secondary enhanced dedicated channel E-DCH dedicated physical control channel (Secondary E-DCH Dedicated Physical Control Channel, S-E-DPCCH) to carry the sub stream data and control information, and a base station NodeB side can determine, according to channel code detection, that a data stream in the current transmission is sub stream data. In addition, when data transmission is performed in a single-stream transmission form, a configuring module may also indicate main stream data and sub stream data by using bit information in a non-pilot bit of the S-DPCCH, for example, may perform indication by using a form shown in Table 1 or Table 2. In should be noted that, in the retransmission of the sub stream data, the sub stream data is carried on an E-DPDCH data channel, and weighting is performed by using a weighting coefficient for primary precoding weighting. As shown in FIG. 2, generally, in double-stream MIMO, main stream data is weighted by using W1 and W2, and sub stream data is weighted by using W3 and W4. In an embodiment of retransmitting the sub stream data in the present invention, an E-DPDCH is adopted to carry to-be-retransmitted sub stream data, and the weights W1 and W2 that are generally used to perform weighting on main stream data are adopted to perform weighting on the to-be-retransmitted sub stream data.

When a processing module sends main and sub stream data to a NodeB in process D1 in an HARQ_RTT according to a double-stream transmission form corresponding to a rank value 2, a received acknowledgement character indicates that the main stream data is correct but the sub stream data is wrong, and a rank value for next transmission is 2, a determining module may perform, according to a double-stream transmission form corresponding to the rank value 2, sending of new main stream data and retransmission of the sub stream data at a same time in process D1 in a next HARQ_RTT, and may adopt a historical power configuration, a power offset newly scheduled in process D1 in the next HARQ_RTT, or the larger value of the historical power offset and the power offset newly scheduled in process D1, that is, Max {a historical power offset, a power offset newly scheduled in process D1 in the next HARQ_RTT}. In other words, when sending the new main stream data and retransmitting the sub stream data in the double-stream transmission form, the UE may adopt power offsets of the foregoing three forms. A person skilled in the art may perform selection according to different application scenarios, for example, in a situation in which channel quality changes little between two times of transmission, adopting a historical power offset can obtain a relatively good combined gain. In some other embodiments of the present invention, the determining module may further retransmit the sub stream data in process D1 in the next HARQ_RTT according to the double-stream transmission form corresponding to the rank value 2, that is, retransmit the sub stream data on both channels on which the two data streams, the main stream and the sub stream, should be transmitted originally, and adopt the historical power offset. In some application scenarios of the present invention, in a situation in which there is no new data to be transmitted in process D1 in a next HARQ_RTT, only sub stream data may be retransmitted according to a single-stream transmission form.

When a processing module sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 1, a determining module may retransmit the main stream data in process D1 in a next HARQ_RTT according to a single-stream transmission form corresponding to the rank value 1, and adopt a new power offset, which is corresponding to the main stream data according to the rank value 1. For data of a certain block length, in a situation in which rank values used for transmission in a process in a previous HARQ_RTT and in a same process in a next HARQ_RTT change, adopting a new power offset corresponding to the new rank value can ensure data transmission performance.

When a processing module sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 2, a determining module may perform, according to a double-stream transmission form corresponding to the rank value 2, retransmission of the main stream data and sending of new sub stream data at a same time in process D1 in a next HARQ_RTT, and adopt a historical power offset. In some other embodiments of the present invention, when a processing module sends main and sub stream data to a NodeB in process D1 in an HARQ_RTT according to a double-stream transmission form corresponding to a rank value 2, a received acknowledgement character indicates that the main stream data is wrong but the sub stream data is correct, and a rank value for next transmission is 2, a determining module may retransmit the main stream data in process D1 in a next HARQ_RTT according to a double-stream transmission form corresponding to the rank value 2, that is, retransmit the main stream data on channels on which the main and sub stream data should be transmitted originally, and adopt a historical power configuration. In some application scenarios of the present invention, in a situation in which there is no new data to be transmitted on a UE side, a UE may retransmit only main stream data according to a single-stream transmission form.

When a processing module sends main and sub stream data to a NodeB in process D1 in an HARQ_RTT according to a rank value 2, a received acknowledgement character indicates that the main and sub stream data are both wrong, and a rank value for next transmission is 1, a determining module may, in process D1 in a next HARQ_RTT according to a single-stream transmission form corresponding to the rank value 1, retransmit the main stream data, discard the sub stream data, and adopt a new power offset, which is corresponding to the main stream data according to the rank value 1.

When a processing module sends main and sub stream data to a NodeB in process D1 in an HARQ_RTT according to a double-stream transmission form corresponding to a rank value 2, a received acknowledgement character indicates that the main and sub stream data are both wrong, and a rank value for next transmission is 2, a determining module may retransmit the main and sub stream data in process D1 in a next HARQ_RTT according to a double-stream transmission form corresponding to the rank value 2, and adopt a historical power offset.

Figure 4:
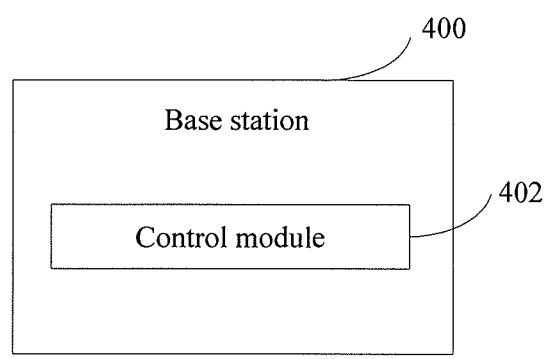
FIG. 4 shows a schematic structural diagram of a base station according to an embodiment of the present invention.

Referring to FIG. 4, FIG. 4 shows a schematic structural diagram of a base station according to an embodiment of the present invention, where a base station 400 may specifically include:

a control module 402, configured to detect channel code of a first E-DCH dedicated physical control channel and a second E-DCH dedicated physical control channel, so as to determine first stream data and second stream data.

In an embodiment of the present invention, when a user equipment (UE) sends main stream data, the main stream data and control information are carried on a data channel E-DPDCH and a control channel E-DPCCH; and when a UE sends sub stream data, the sub stream data and data information are carried on a data channel S-E-DPDCH and a control channel S-E-DPCCH. On a base station (NodeB) side, a control module may determine the main stream data and the sub stream data by detecting channel code of the E-DPCCH and the S-E-DPCCH. In other words, main stream data and sub stream data are indicated according to a difference in channel code of the E-DPCCH and S-E-DPCCH. The embodiment that indicating main and sub streams by using channel code is applicable to all the foregoing data transmission manners, applicable to a situation in which a main stream or a sub stream is transmitted according to a single-stream transmission form, and also applicable to a situation in which two data streams, main and sub streams, are transmitted according to a double-stream transmission form.

In some other embodiments of the present invention, a UE indicates main and sub streams by using a bit in a non-pilot bit of a physical channel S-DPCCH, and a control module in a base station (NodeB) may determine first stream data and second stream data according to bit indication information in a non-pilot bit of the S-DPCCH. For example, as shown in the following Table 3:

TABLE 3

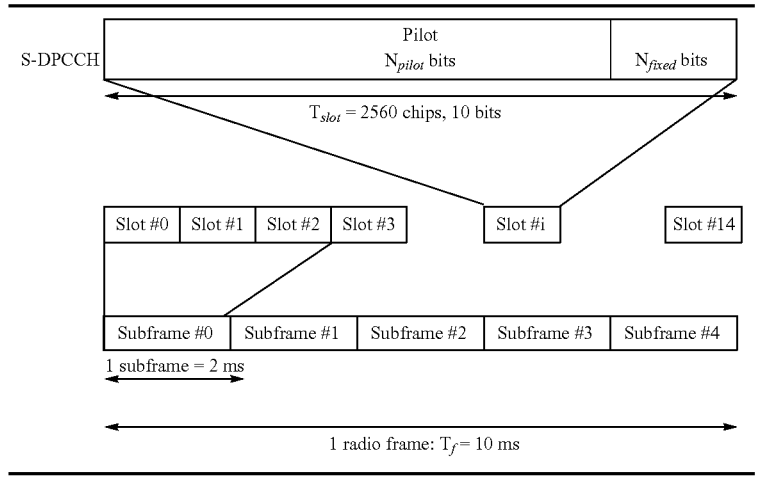

A timeslot in an S-DPCCH includes 10 bits, among which eight bits are pilot bits, and the remaining two bits are non-pilot bits. The remaining two bits may serve as bits indicating main and sub streams, where bit indication may be as shown in Table 1 or Table 2.

In the multiple-input multiple-output (MIMO) transmission method and apparatus that implement the present invention, a user equipment (UE) can correctly perform HARQ transmission using MIMO under independent indications of a rank value and an ACK/NACK and without changing an existing uplink HARQ mechanism, thereby effectively ensuring MIMO performance of inter-stream interference suppression and the like. In addition, a base station (NodeB) is also enabled to correctly identify transmission of main and sub stream data when a rank value is 1.

A person of ordinary skill in the art may understand that all or a part of the procedures of the methods in the embodiments may be implemented by a program instructing relevant hardware. The program may be stored in a computer readable storage medium. When the program runs, the procedures of the methods in the embodiments are performed. The foregoing storage medium may be: a magnetic disk, an optical disc, a read-only memory (Read-Only Memory, ROM), a random access memory (Random Access Memory, RAM), or the like.

The disclosed above is merely exemplary embodiments of the present invention, and is certainly not intended to limit the protection scope of the present invention. Any equivalent variation made in accordance with the claims of the present invention shall fall within the scope of the present invention.

What is claimed is:

1. An uplink multiple-input multiple-output (MIMO) transmission method, comprising:
   sending, by a user equipment (UE), first data to a NodeB in a first process in a hybrid automatic repeat request round trip time (HARQ_RTT);
   receiving, by the UE, an acknowledgement character related to the first data and returned by the NodeB; and
   determining, by the UE according to the acknowledgement character and a rank value to be used for next transmission, data transmission of the first process in a next HARQ_RTT;
   wherein the rank value to be used for next transmission comprises 1 or 2;
   wherein, when the first data is first stream data, determining, by the UE according to the acknowledgement character and a rank value to be used for next transmission, data transmission of the first process in a next HARQ_RTT, comprises:
      when the acknowledgement character indicates the first stream data is correct, and the rank value is 1, sending, by the UE, new first stream data in the first process in the next HARQ_RTT according to a single-stream transmission form corresponding to the rank value 1, and adopting a power offset newly scheduled in the first process; and
      when the acknowledgement character indicates the first stream data is correct, and the rank value is 2, sending, by the UE, new first stream data and new second stream data in the first process in the next HARQ_RTT according to a double-stream transmission form corresponding to the rank value 2, and adopting a power offset newly scheduled in the first process.

2. The method according to claim 1, wherein, when the first data is first stream data, determining, by the UE according to the acknowledgement character and a rank value to be used for next transmission, data transmission of the first process in a next HARQ_RTT, further comprises:
   when the acknowledgement character indicates the first stream data is wrong, and the rank value is 1, retransmitting, by the UE, the first stream data in the first process in the next HARQ_RTT according to a single-stream transmission form corresponding to the rank value 1, and adopting a historical power offset; and when the acknowledgement character indicates the first stream data is wrong, and the rank value is 2, retransmitting, by the UE according to a double-stream transmission form corresponding to the rank value 2, the first stream data and sending new second stream data in the first process in the next HARQ_RTT, and both adopting a new power offset, which is corresponding to the first stream data according to the rank value 2.

3. An uplink multiple-input multiple-output (MIMO) transmission method, comprising:
   sending, by a user equipment (UE), first data to a NodeB in a first process in a hybrid automatic repeat request round trip time (HARQ_RTT);
   receiving, by the UE, an acknowledgement character related to the first data and returned by the NodeB; and
   determining, by the UE according to the acknowledgement character and a rank value to be used for next transmission, data transmission of the first process in a next HARQ_RTT;
   wherein the rank value to be used for next transmission comprises 1 or 2;
   wherein, when the first data is first stream data and second stream data, determining, by the UE according to the acknowledgement character and a rank value to be used for next transmission, data transmission of the first process in a next HARQ_RTT, comprises:
      when the acknowledgement character indicates the first stream data and the second stream data are both correct, and the rank value is 1, sending, by the UE, new first stream data in the first process in the next HARQ_RTT according to a single-stream transmission form corresponding to the rank value 1, and adopting a power offset newly scheduled in the first process; and
      when the acknowledgement character indicates the first stream data and the second stream data are both correct, and the rank value is 2, sending, by the UE, new first stream data and new second stream data in the first process in the next HARQ_RTT according to a double-stream transmission form corresponding to the rank value 2, and adopting a power offset newly scheduled in the first process.

4. The method according to claim 3, wherein, when the first data is first stream data and second stream data, determining, by the UE according to the acknowledgement character and a rank value to be used for next transmission, data transmission of the first process in a next HARQ_RTT, further comprises:
   when the acknowledgement character indicates the first stream data is correct but the second stream data is wrong, and the rank value is 1, retransmitting, by the UE, the second stream data in the first process in the next HARQ_RTT according to a single-stream transmission form corresponding to the rank value 1, and adopting a new power offset, which is corresponding to the second stream data according to the rank value 1, or a power offset newly scheduled in the first process, or the larger value of the new power offset corresponding to the rank value 1 and the power offset newly scheduled in the first process; and
   when the acknowledgement character indicates the first stream data is correct but the second stream data is wrong, and the rank value is 2, sending, by the UE according to a double-stream transmission form corresponding to the rank value 2, new first stream data and retransmitting the second stream data in the first process in the next HARQ_RTT, and adopting a historical power offset, or a power offset newly scheduled in the first process, or the larger value of the historical power offset and the power offset newly scheduled in the first process.

5. The method according to claim 3, wherein, when the first data is first stream data and second stream data, determining, by the UE according to the acknowledgement character and a rank value to be used for next transmission, data transmission of the first process in a next HARQ_RTT, further comprises:
   when the acknowledgement character indicates the first stream data is correct but the second stream data is wrong, and the rank value is 1, retransmitting, by the UE, the second stream data in the first process in the next HARQ_RTT according to a single-stream transmission form corresponding to the rank value 1, and adopting a new power offset, which is corresponding to the second stream data according to the rank value 1, or a power offset newly scheduled in the first process, or the larger value of the new power offset corresponding to the rank value 1 and the power offset newly scheduled in the first process; and
   when the acknowledgement character indicates the first stream data is correct but the second stream data is wrong, and the rank value is 2, retransmitting, by the UE, the second stream data in the first process in the next HARQ_RTT according to a double-stream transmission form corresponding to the rank value 2, and adopting a historical power offset.

6. The method according to claim 4, wherein retransmitting, by the UE, the second stream data in the first process in the next HARQ_RTT according to a single-stream transmission form corresponding to the rank value 1, comprises:
   retransmitting, by the UE, the second stream data in the first process in the next HARQ_RTT, with the second stream data and control information of the second stream data being carried on an enhanced dedicated channel (E-DCH) dedicated physical data channel (E-DPDCH) and a secondary enhanced dedicated channel (E-DCH) dedicated physical control channel (S-E-DPCCH).

7. The method according to claim 4, further comprising:
   indicating, by the UE when data transmission is performed according to a single-stream transmission form, the first stream data and the second stream data by using a non-pilot bit of a secondary dedicated physical control channel S-DPCCH.

8. A user equipment, comprising:
   a processing device comprising at least one processor; and
   memory coupled to the processing device, the memory comprising instructions that, when executed by the processing device, cause the user equipment to:
   send first data to a NodeB in a first process in a hybrid automatic repeat request round trip time (HARQ_RTT), and receive an acknowledgement character related to the first data and returned by the NodeB; and
   determine, according to the acknowledgement character and a rank value to be used for next transmission, data transmission of the first process in a next HARQ_RTT;
   wherein the rank value to be used for next transmission comprises 1 or 2;
   wherein, when the first data is first stream data, the memory comprises instructions that, when executed by the processing device, cause the user equipment to:
      when the acknowledgement character indicates the first stream data is correct, and the rank value is 1, send new first stream data in the first process in the next HARQ_RTT according to a single-stream transmission form corresponding to the rank value 1, and adopt a power offset newly scheduled in the first process; and when the acknowledgement character indicates the first stream data is correct, and the rank value is 2, send new first stream data and new second stream data in the first process in the next HARQ_RTT according to a double-stream transmission form corresponding to the rank value 2, and adopt a power offset newly scheduled in the first process.

9. The user equipment according to claim 8, wherein, when the first data is first stream data, the memory comprises instructions that, when executed by the processing device, cause the user equipment to:

when the acknowledgement character indicates the first stream data is wrong, and the rank value is 1, retransmit the first stream data in the first process in the next HARQ_RTT according to a single-stream transmission form corresponding to the rank value 1, and adopt a historical power offset; and when the acknowledgement character indicates the first stream data is wrong, and the rank value is 2, perform, according to a double-stream transmission form corresponding to the rank value 2, retransmission of the first stream data and sending of new second stream data in the first process in the next HARQ_RTT, and both adopt a new power offset, which is corresponding to the first stream data according to the rank value 2.

10. A user equipment, comprising:

a processing device comprising at least one processor; and memory coupled to the processing device, the memory comprising instructions that, when executed by the processing device, cause the user equipment to:

send first data to a NodeB in a first process in a hybrid automatic repeat request round trip time (HARQ_RTT), and receive an acknowledgement character related to the first data and returned by the NodeB; and determine, according to the acknowledgement character and a rank value to be used for next transmission, data transmission of the first process in a next HARQ_RTT, wherein the rank value to be used for next transmission comprises 1 or 2;

wherein, when the first data is first stream data and second stream data, the memory comprises instructions that, when executed by the processing device, cause the user equipment to:

when the acknowledgement character indicates the first stream data and the second stream data are both correct, and the rank value is 1, send new first stream data in the first process in the next HARQ_RTT according to a single-stream transmission form corresponding to the rank value 1, and adopt a power offset newly scheduled in the first process; and when the acknowledgement character indicates the first stream data and the second stream data are both correct, and the rank value is 2, send new first stream data and new second stream data in the first process in the next HARQ_RTT according to a double-stream transmission form corresponding to the rank value 2, and adopt a power offset newly scheduled in the first process.

11. The user equipment according to claim 10, wherein, when the first data is first stream data and second stream data, the memory comprises instructions that, when executed by the processing device, cause the user equipment to:

when the acknowledgement character indicates the first stream data is correct but the second stream data is wrong, and the rank value is 1, retransmit the second stream data in the first process in the next HARQ_RTT according to a single-stream transmission form corresponding to the rank value 1, and adopt a new power offset, which is corresponding to the second stream data according to the rank value 1, or a power offset newly scheduled in the first process, or the larger value of the new power offset corresponding to the rank value 1 and the power offset newly scheduled in the first process; and when the acknowledgement character indicates the first stream data is correct but the second stream data is wrong, and the rank value is 2, send, according to a double-stream transmission form corresponding to the rank value 2, new first stream data and retransmit the second stream data in the first process in the next HARQ_RTT, and adopt a historical power offset, or a power offset newly scheduled in the first process, or the larger value of the historical power offset and the power offset newly scheduled in the first process.

12. The user equipment according to claim 10, wherein, when the first data is first stream data and second stream data, the memory comprises instructions that, when executed by the processing device, cause the user equipment to:

when the acknowledgement character indicates the first stream data is correct but the second stream data is wrong, and the rank value is 1, retransmit the second stream data in the first process in the next HARQ_RTT according to a single-stream transmission form corresponding to the rank value 1, and adopt a new power offset, which is corresponding to the second stream data according to the rank value 1, or a power offset newly scheduled in the first process, or the larger value of the new power offset corresponding to the rank value 1 and the power offset newly scheduled in the first process; and when the acknowledgement character indicates the first stream data is correct but the second stream data is wrong, and the rank value is 2, retransmit the second stream data in the first process in the next HARQ_RTT according to a double-stream transmission form corresponding to the rank value 2, and adopt a historical power offset.

13. The user equipment according to claim 11, wherein the memory further comprises instructions that, when executed by the processing device, cause the user equipment to retransmit the second stream data in the first process in the next HARQ_RTT, with the second stream data and control information of the second stream data being carried on an enhanced dedicated channel (E-DCH) dedicated physical data channel (E-DPDCH) and a secondary enhanced dedicated channel (E-DCH) dedicated physical control channel (S-E-DPCCH).

14. The user equipment according to claim 11, wherein the memory further comprises instructions that, when executed by the processing device, cause the user equipment to:

when data transmission is performed according to a single-stream transmission form, indicate the first stream data and the second stream data by using a non-pilot bit of a secondary dedicated physical control channel (S-DPCCH).

* * * * *